United States Patent
Zenere

(10) Patent No.: US 9,434,107 B2
(45) Date of Patent: Sep. 6, 2016

(54) MODELING PLATE FOR A STEREOLITHOGRAPHY MACHINE, STEREOLITHOGRAPHY MACHINE USING SAID MODELING PLATE AND TOOL FOR CLEANING SAID MODELING PLATE

(71) Applicant: DWS S.R.L., Zane' (IT)

(72) Inventor: Sergio Zenere, Carre' (IT)

(73) Assignee: DWS S.R.L., Zan (IT)

( * ) Notice: Subject to any disclaimer, the term of this patent is extended or adjusted under 35 U.S.C. 154(b) by 8 days.

(21) Appl. No.: 14/526,829

(22) Filed: Oct. 29, 2014

(65) Prior Publication Data

US 2015/0054198 A1 Feb. 26, 2015

Related U.S. Application Data

(62) Division of application No. 13/517,184, filed as application No. PCT/IB2011/000034 on Jan. 11, 2011, now abandoned.

(51) Int. Cl.
*B29C 67/00* (2006.01)

(52) U.S. Cl.
CPC ....... *B29C 67/0066* (2013.01); *B29C 67/0085* (2013.01); *B29C 67/0055* (2013.01)

(58) Field of Classification Search
CPC .............. B29C 35/08; B29C 67/0066; B29C 67/0085; B29C 67/0055
USPC .............. 264/401, 446, 308; 425/174.4, 375, 425/112, 150; 15/236.06, 236.08
See application file for complete search history.

(56) References Cited

U.S. PATENT DOCUMENTS

| | | | | |
|---|---|---|---|---|
| 4,364,145 A * | 12/1982 | Jones et al. | | 15/236.02 |
| 4,667,362 A * | 5/1987 | Mattingly | | 15/236.08 |
| 5,545,367 A * | 8/1996 | Bae et al. | | 264/401 |
| 5,554,336 A * | 9/1996 | Hull | | 264/401 |
| 5,609,814 A * | 3/1997 | Takano | | 264/401 |
| 5,776,409 A * | 7/1998 | Almquist et al. | | 264/401 |
| 6,406,658 B1 * | 6/2002 | Manners | B29C 67/0092 | 264/401 |
| 7,481,647 B2 * | 1/2009 | Sambu et al. | | 425/436 R |
| 7,845,930 B2 * | 12/2010 | Shkolnik | B29C 67/0066 | 264/308 |
| 8,142,179 B2 * | 3/2012 | Kihara et al. | | 425/375 |
| 8,894,400 B2 * | 11/2014 | Costabeber | | 425/174.4 |
| 2001/0048183 A1 * | 12/2001 | Fujita | B29C 67/007 | 264/401 |
| 2008/0305537 A1 * | 12/2008 | Sato | B01J 19/0046 | 435/287.2 |
| 2009/0042320 A1 * | 2/2009 | Wang | H01L 21/6715 | 438/5 |
| 2009/0130449 A1 * | 5/2009 | El-Siblani | A61C 13/0013 | 428/409 |
| 2011/0309554 A1 * | 12/2011 | Liska et al. | | 264/401 |
| 2013/0084424 A1 * | 4/2013 | Cangiano | E04C 2/06 | 428/138 |
| 2014/0265034 A1 * | 9/2014 | Dudley | | 264/401 |
| 2015/0102531 A1 * | 4/2015 | El-Siblani et al. | | 264/401 |
| 2015/0323712 A1 * | 11/2015 | Lim | G02B 5/04 | 428/167 |

FOREIGN PATENT DOCUMENTS

KR 10-2005-0108953 * 11/2005 ............ B29C 67/00

* cited by examiner

*Primary Examiner* — Nahida Sultana

(74) *Attorney, Agent, or Firm* — Husch Blackwell LLP; Jon P. Christensen

(57) ABSTRACT

The invention is a modeling plate (6; 6'; 6") for a stereolithography machine (1) suited to produce three-dimensional objects (A) through superimposition of a plurality of layers (E) with predefined thickness of a liquid substance (3) that solidifies when subjected to a selective stimulation (4). The plate (6; 6'; 6") comprises a work surface (7) that supports the object (A) and grooves (8) made in the work surface (7) along a development trajectory (X).

17 Claims, 7 Drawing Sheets

MODELING PLATE FOR A STEREOLITHOGRAPHY MACHINE, STEREOLITHOGRAPHY MACHINE USING SAID MODELING PLATE AND TOOL FOR CLEANING SAID MODELING PLATE

This application is a continuation of U.S. application Ser. No. 13/517,184 filed Jul. 26, 2012, the parent application being incorporated by reference in its entirety.

The present invention concerns a modelling plate for a stereolithography machine, as well as a stereolithography machine comprising said plate.

The present invention also concerns a tool for cleaning the above mentioned modelling plate.

As is known, the stereolithography technique makes it possible to produce three-dimensional objects by superimposing a succession of layers obtained by means of a liquid resin that solidifies when subjected to a predefined stimulation.

Each layer of the object is obtained by selectively stimulating the resin so as to solidify it in the points that make up a corresponding section of the object to be produced.

As is known, a stereolithography machine generally comprises a tank suited to contain the liquid resin, a device suited to stimulate a liquid resin layer having a predefined thickness and a moving modelling plate that supports the three-dimensional object during its formation.

To create the first layer of the object, the surface of the plate is brought to the level of the above mentioned liquid layer to be stimulated, so that the first layer of the object is formed against the plate and adheres to it.

To create each successive layer, the plate moves the object away from the previous position, so as to allow the resin to restore the liquid layer that will serve to form the successive layer.

Then the plate moves the object back to such a position that the last layer is against the liquid resin layer, so that the latter solidifies while adhering to the previous layer.

The stereolithography machines of known type pose the drawback that it is not easy to remove the finished object from the modelling plate.

In particular, since the object adheres to the plate and is very fragile, it must be detached using a sharp metal blade that is slided over the plate to separate the object from the surface of the plate itself.

This operation involves the risk of deforming or breaking the object and therefore it must be carried out manually and with great care, with the double drawback of increasing labour costs and the risk of rejects.

The blade poses another drawback lying in that some surface particles are removed from the plate.

Besides damaging the plate, this causes another drawback, represented by the fact that the above mentioned particles contaminate the residual liquid resin present in the tank, thus affecting the soundness of the objects that are produced successively.

Further drawbacks are posed by the stereolithography machines in which the stimulation device is positioned under the tank, which is provided with a bottom that is transparent to stimulation.

In this variant, the stimulation device is configured so as to solidify the resin layer adjacent to the bottom of the tank itself, so that the object is formed under the modelling plate and on creation of each successive layer the plate is progressively lifted from the bottom of the tank.

The vertical movements of the plate cause the resin to flow from the centre of the plate towards its sides and vice versa, depending on the direction of movement.

Due to the viscosity of the resin and its consequent difficulty in flowing, the movement of the plate exerts a certain pressure on the bottom of the tank, which increases in proportion to the viscosity of the resin, the plate movement speed and the proximity of the plate to the bottom of the tank.

In particular, during the formation of the first layers, the modelling plate is arranged at a distance from the bottom of the tank in the order of a few hundredths of a millimeter.

Therefore, during the formation of the first layers, the pressures determined by the movements of the plate are so high that it is necessary to limit the plate speed, with the inconvenience of considerably increasing the processing costs.

The problem described above is addressed in the Italian patent application VI2008A000311, in the name of the same applicant who filed the present application.

This document discloses a stereolithography machine comprising a plate provided with through holes that, allowing the resin to flow from one face of the plate to the other, prevent the resin from flowing towards the sides of the plate.

Therefore, advantageously, the presence of the holes reduces the amount of pressure exerted on the bottom of the tank and makes it possible to increase the plate movement speed even during the formation of the first layers.

Furthermore, the holes prevent the plate from adhering to the bottom of the tank, producing the so-called "sucker effect" described in detail in the above mentioned document of the known art.

However, the holed plate poses the same drawbacks described above with reference to the removal of the object and to the cleaning of the plate, as well as adding new drawbacks.

It is known, in fact, that in order to make the layers adhere to the surface of the plate it is necessary to stimulate a layer of resin slightly thicker than is strictly required.

Consequently, when a holed plate is used, part of the resin belonging to the first layers of the object solidifies inside the holes and remains stuck therein, thus hindering the successive removal of the plate at the end of the processing cycle.

In particular, if the object is removed by means of the above mentioned sharp metal blade, there is the inconvenience that the portions of resin that solidified in the holes are separated from the rest of the object and remain stuck in the holes.

Therefore, after removing the object, a further operation is necessary to remove the resin that is stuck in the holes.

Differently from the variant embodiment described above, a further variant embodiment of a stereolithography machine has the stimulation device arranged over the tank and configured so as to solidify the surface layer of the resin.

In this embodiment, the object is formed over the plate, which is progressively lowered as the construction of the object proceeds.

Even if this variant embodiment does not pose the drawbacks related to the pressure exerted on the bottom of the tank, it nevertheless poses the drawbacks related to the removal of the object from the plate and to the cleaning of the latter, described with reference to the previous variant embodiment.

The present invention intends to overcome all the drawbacks of the known art as outlined above.

In particular, it is a first object of the invention to provide a modelling plate for stereolithography machines that allows the finished object to be removed more comfortably than allowed by the plates of known type.

It is a further object of the invention to provide a plate that is easy to clean.

It is also the object of the invention to provide a plate that, when used on stereolithography machine provided with a stimulation device arranged under the tank, facilitates the flow of the resin from the centre of the plate towards its sides, and vice versa, compared to the plates of known type.

The objects described above are achieved by a modelling plate for a stereolithography machine according to claim 1 and by a stereolithography machine according to the independent claims shown below.

The same objects are also achieved by a cleaning tool and by a kit for a stereolithography machine according to the claims shown below.

Further characteristics and details of the invention are described in the corresponding dependent claims.

Advantageously, making it easier to remove the object from the plate means reducing the need for labor and the number of rejects.

Furthermore, making it easier to clean the plate means reducing the risk of contaminating the resin and thus also means offering the corresponding advantages.

Still advantageously, the easier flow of the resin allows plate movement speeds to be adopted that are analogous to those achievable with holed plates of known type.

Therefore, it is possible to reduce the processing time of a single object and thus reduce its cost.

The said objects and advantages, together with others which will be highlighted below, are illustrated in the description of preferred embodiments of the invention which are provided by way of non-limiting examples with reference to the attached drawings, wherein.

Figure 1:
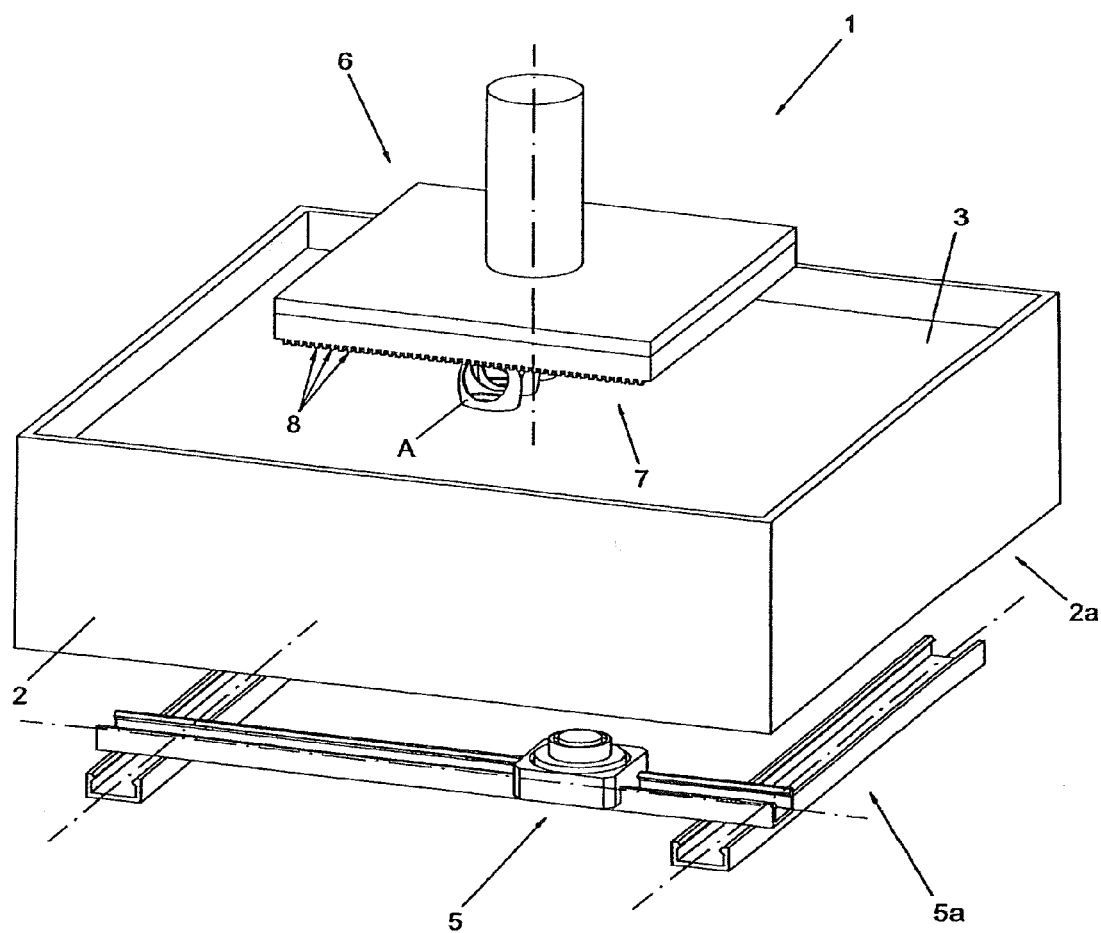
FIG. 1 shows an axonometric view of the stereolithography machine that is the subject of the invention.
Figure 2A:
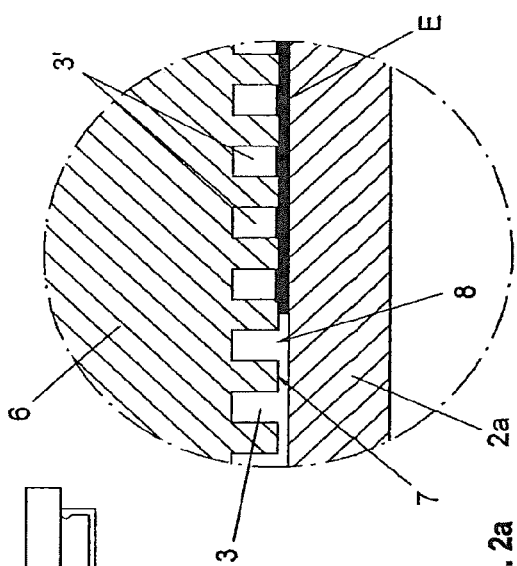
FIG. 2a shows an enlarged detail of FIG. 2.
Figure 2:
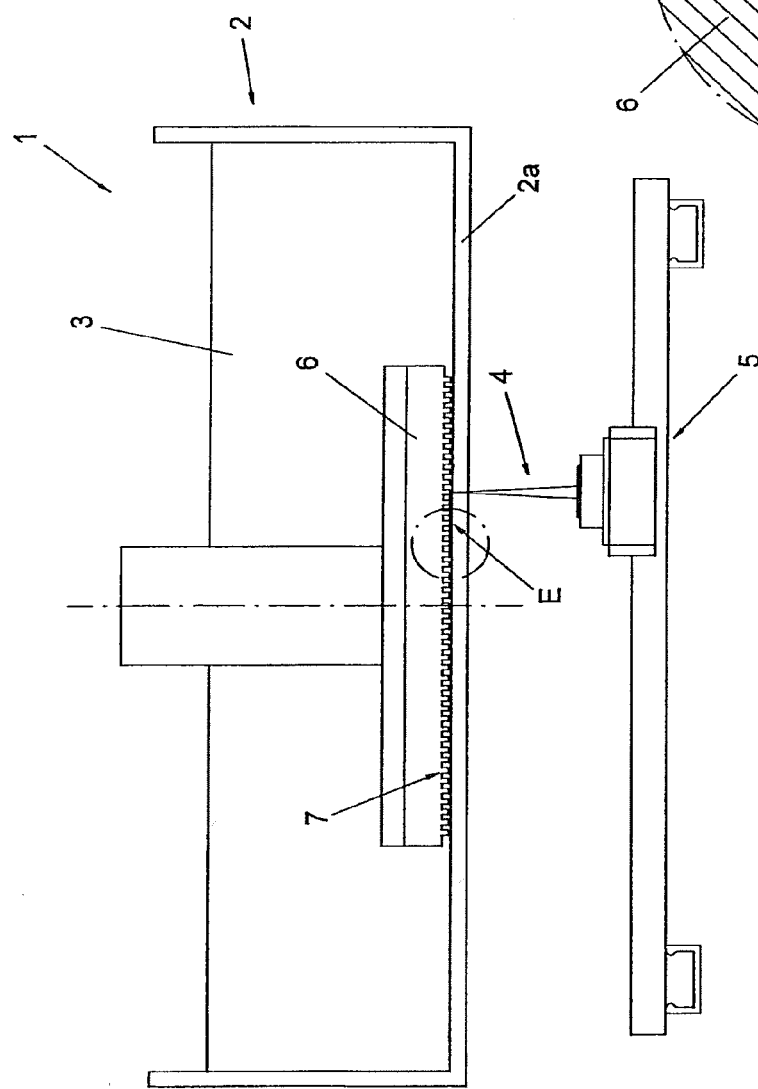
FIG. 2 shows a side section view of the machine shown in FIG. 1.

As shown in FIG. 1, the stereolithography machine 1 of the invention comprises a tank 2 suited to contain a liquid substance 3 suited to solidify when subjected to a selective stimulation 4, shown in FIG. 2.

The above mentioned selective stimulation 4 is generated through emission means 5 that convey it towards the tank 2.

Preferably but not necessarily the liquid substance 3 is a light-sensitive resin and the emission means 5 comprise a laser emitter associated with scanner means 5a of any known type suited to direct the laser beam on the points of the layer of resin 3 to be solidified.

Obviously, variant embodiments of the invention may include other known types of emission means 5, provided that they can solidify the liquid substance 3.

The machine 1 also comprises a modelling plate 6, provided with a work surface 7 facing said emission means 5 and suited to support a three-dimensional object A being formed.

The machine 1 described above makes it possible to produce the three-dimensional object A by superimposing a plurality of layers E of said solidified resin 3 having a predefined thickness.

In particular, the first layers adhere to the work surface 7 of the plate 6, while the successive layers adhere to the previous ones.

Preferably but not necessarily the machine 1 is configured so as to form the object A under the modelling plate 6, as shown in FIGS. 1 and 2.

In particular, the emission means 5 are arranged under the tank 2 that has a bottom 2a that is transparent to stimulation 4.

Obviously, in this case, the plate 6 is arranged with the work surface 7 facing the bottom 2a of the tank 2.

According to a variant embodiment of the stereolithography machine of the invention, not shown herein, the emission means 5 are arranged over the tank 2.

In this second variant embodiment, the modelling plate 6 is arranged with the work surface 7 facing upwards and the three-dimensional object A is formed over the plate.

Figure 3:
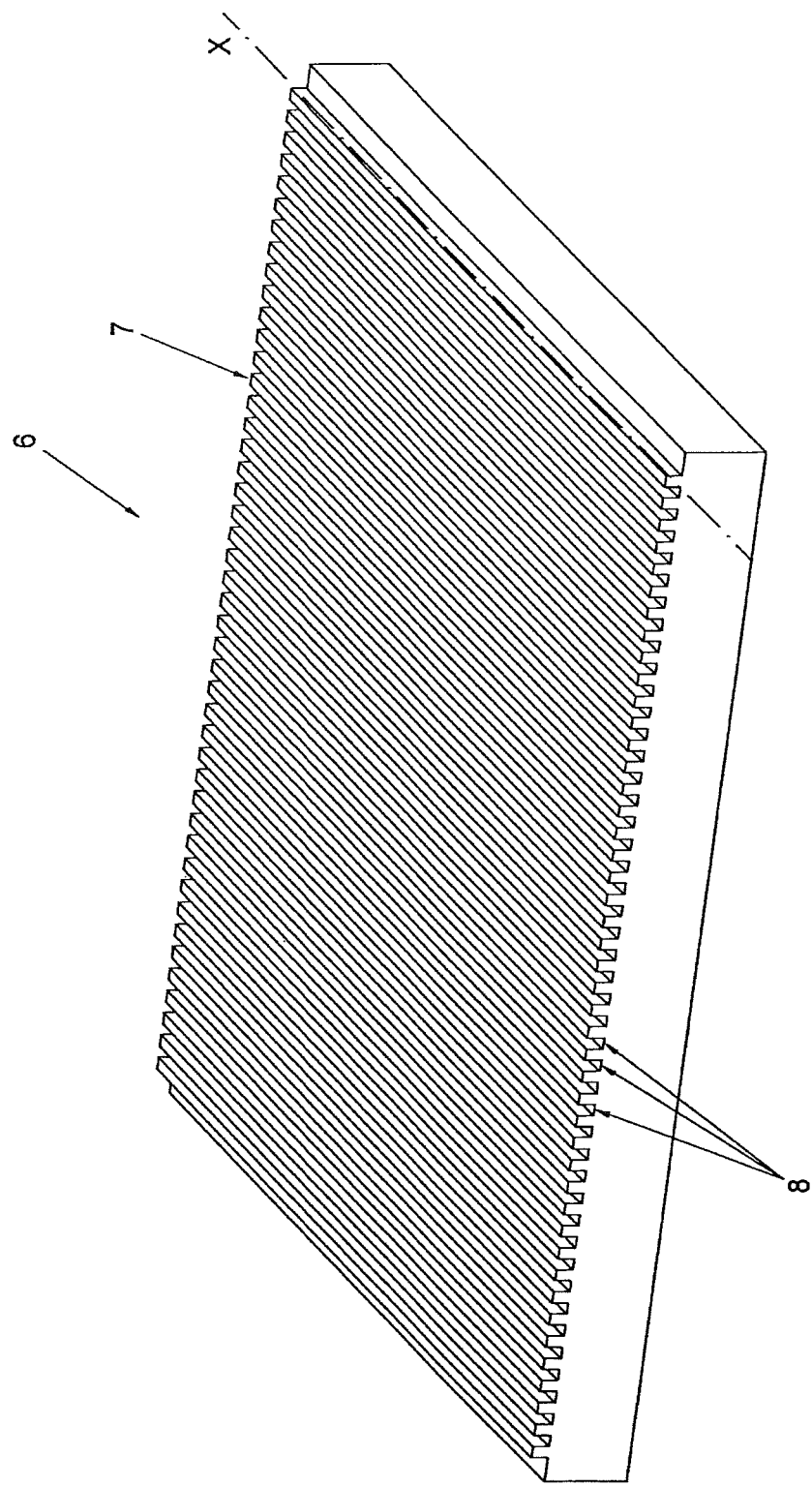
FIG. 3 shows an axonometric view of the modelling plate that is the subject of the invention.

According to the invention, the plate 6 comprises a plurality of grooves 8 made in the work surface 7 along corresponding development trajectories parallel to one another and preferably rectilinear, as shown in FIG. 3.

During the formation of the first layers E on the object A adjacent to the work surface 7 of the plate 6, the resin 3' located in the grooves 8 is not reached by the stimulation 4 and, therefore, remains liquid, thus defining a corresponding number of channels interposed between the solidified object A and the plate 6, as shown in FIG. 2.

Figure 5:
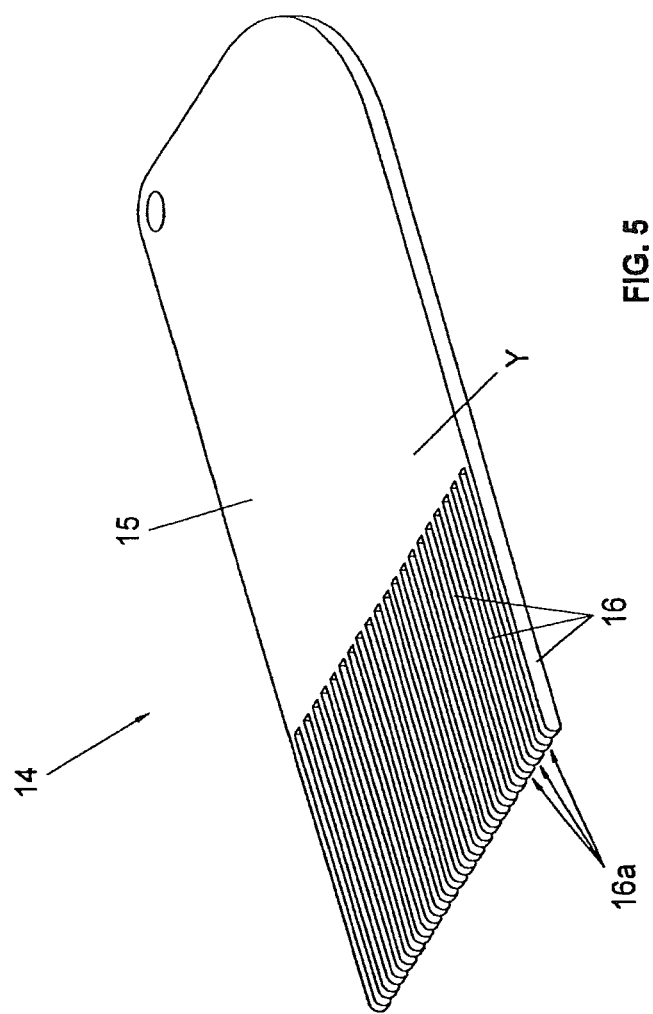
FIG. 5 shows an axonometric view of the tool that is the subject of the invention.

At the end of the processing cycle, a corresponding elongated element 16 belonging to a cleaning tool 14, shown in FIG. 5, can be inserted and slided into each one of the above mentioned channels.

Figure 8:
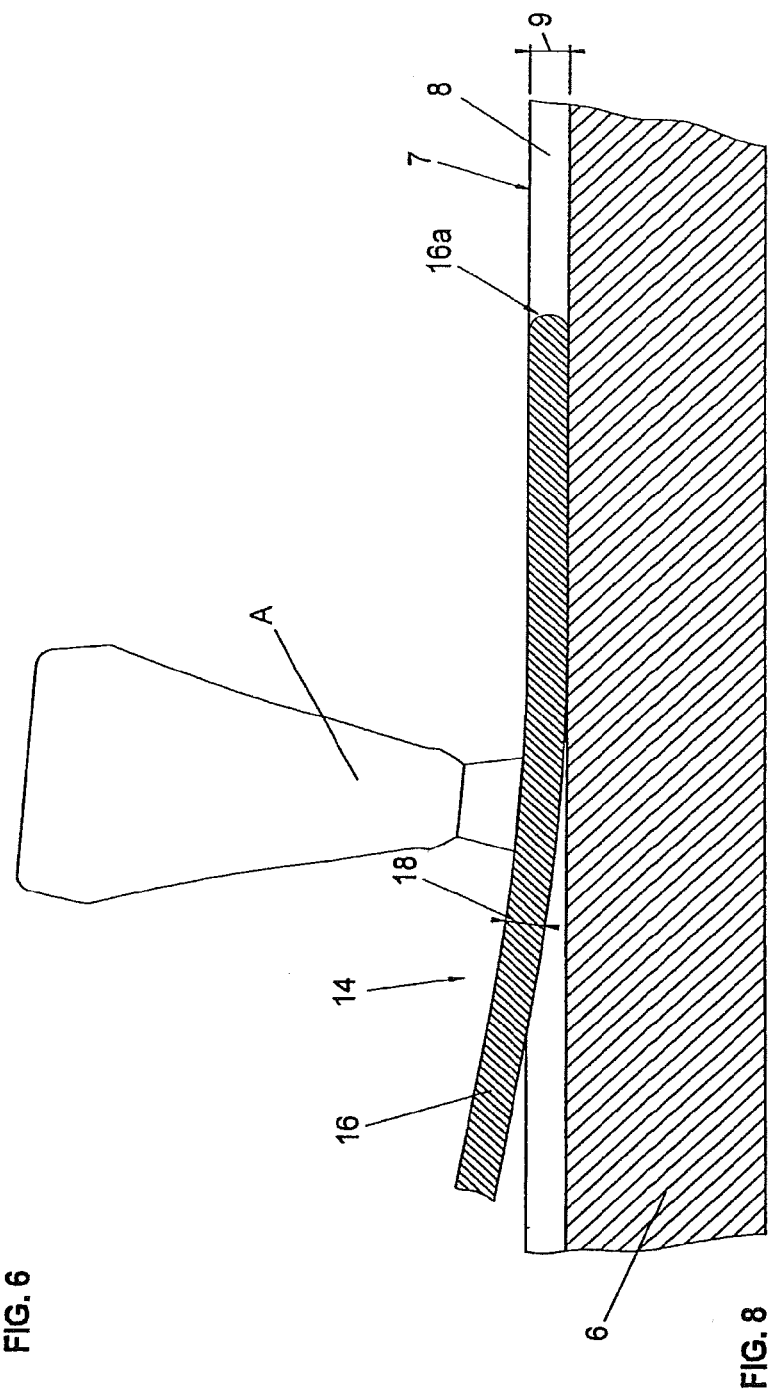
FIG. 8 shows a side section view of a detail of FIG. 7.

The elongated element 16 can exert a thrusting action on the three-dimensional object A in order to detach it from the work surface 7, as shown in FIG. 8.

Therefore, the above mentioned grooves 8 make it easier to detach the finished object A from the work surface 7, thus achieving one of the objects of the invention.

Advantageously, the above mentioned thrusting action poses fewer risks of damaging the object A than the known techniques, according to which the object A is removed using a sharp tool.

Furthermore, advantageously, the tool A is not provided with a cutting edge and therefore cannot damage the plate 6.

Furthermore, as the object A is removed completely, it does not leave solid residues inside the grooves 8, thus achieving the further object to facilitate the cleaning of the plate 6.

The grooves 8 preferably extend to the perimeter edge of the work surface 7, opening up at the level of the lateral surface of the modelling plate 6, as clearly visible in FIG. 3.

It is clear that the above mentioned open end allows the resin 3 to flow from the grooves 8 towards the lateral area of the plate 6, and vice versa, during the vertical movement of the plate 6 itself.

Therefore, if the plate 6 is arranged with the work surface 7 facing the bottom 2a of the tank 2, the resin 3 can flow along the grooves 8 from the centre of the plate 6 towards its sides, and vice versa.

Therefore, the invention achieves the object to facilitate the flow of the resin 3, especially when the plate 6 is arranged very near the bottom 2a of the tank 2.

Advantageously, the facilitated flow of the resin 3 makes it possible to reduce the pressure exerted on the bottom 2a of the tank 2 during the vertical movement of the plate 6.

Therefore, advantageously, it is possible to select movement speeds of the plate 6 that are equivalent to those possible, for example, with holed plates of known type, and in any case exceed those allowed by other known types of plate.

The grooves 8 preferably have depths 9 exceeding the thickness of the layers E that make up the three-dimensional object A, for example in the order of tenths of a millimeter or more.

Advantageously, this makes it possible to prevent the first layers of the object A from clogging the grooves 8, if solidification occurs partly inside them due to processing needs or mispositioning of the plate 6.

The first case is the most common and derives from the fact that, to ensure the adhesion of the first layers E to the work surface 7 of the plate 6, a stimulation 4 is employed whose intensity is higher than the intensity strictly necessary to solidify the layer having predefined thickness.

The higher intensity of the stimulation causes a partial solidification of the resin 3' arranged inside the grooves 8, as shown in FIG. 2a.

The number of grooves 8, their width and their mutual distances on the plate 6 are parameters that can be selected by the manufacturer based on the operating characteristics of the machine 1 on which the plate 6 must be used.

In general, a more viscous resin 3 will require more grooves 8 in order to allow the optimal flow of the resin 3.

A higher number of grooves 8 also facilitates the removal of the object A from the plate 6.

On the other hand, a reduced number of grooves 8 increases the surface area of the work surface 7, thus improving the adhesion of the object A during processing.

By way of example, it has been found that grooves 8 approximately one millimeter wide arranged at a mutual distance of about one millimeter represent a good compromise in many circumstances.

It is evident, however, that in special cases it will be possible to use even one groove 8 only.

The grooves 8 preferably develop with a uniform cross section 11 along a rectilinear trajectory X.

Figure 4:
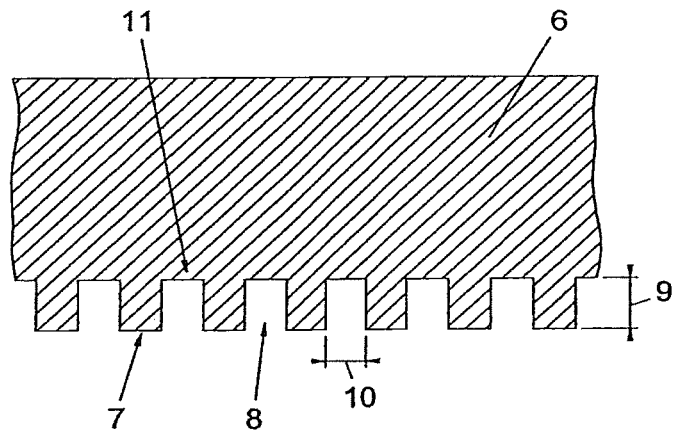
FIG. 4 shows a side section view of a detail of the plate shown in FIG. 3.

In particular, and as shown in FIG. 4, the above mentioned cross section 11 is rectangular.

Figure 4A:
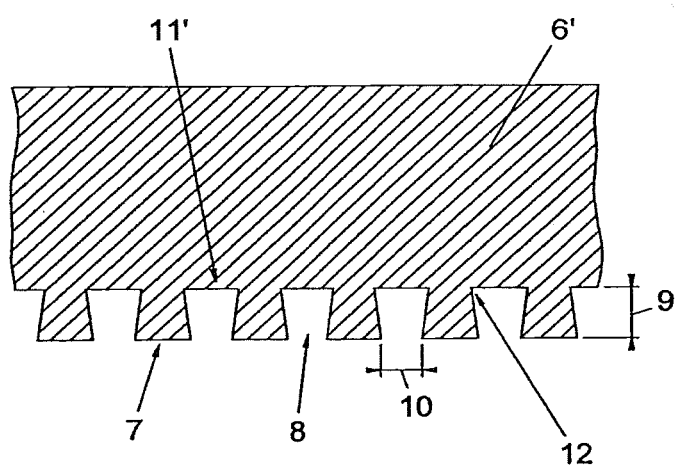
FIGS. 4a and 4b show in detail a side section view of several variant embodiments of the plate shown in FIG. 4.

According to a variant embodiment of the plate of the invention, indicated in FIG. 4a by reference number 6', the cross section 11 has an area 12 whose width exceeds the width 10 of the same section at the level of the work surface 7.

In other words, the cross section 11 features an undercut surface that, advantageously, facilitates the adhesion of the three-dimensional object A to the groove 8 during the processing cycle.

The undercut is small enough not to hinder the removal of the finished three-dimensional object A from the plate 6.

Preferably but not necessarily the above mentioned cross section 11 has the shape of a trapezium, with the long base defining the bottom 2a of the groove 8 and the short base 10 corresponding to the opening of the groove 8 on the work surface 7.

Figure 4B:
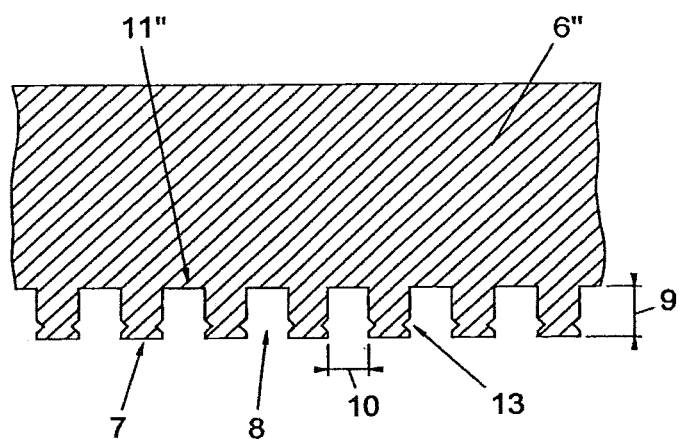

According to a further variant embodiment, indicated in FIG. 4b by reference number 6", the profile of the cross section 11" features a recess 13 on one or both of the edges that delimit the cross section 11" laterally.

Advantageously, said recess 13 further improves the adhesion of the three-dimensional object A to the plate 6 during the processing cycle.

The depth of the above mentioned recess 13 is preferably limited to a few tenths of a millimeter, in such a way as not to hinder the successive removal of the object A.

It is obvious that other variant embodiments may have the characteristics of the previous two embodiments, combined together.

The cleaning tool 14 shown in FIG. 5 comprises a supporting body 15 from which one or more mutually parallel elongated elements 16 develop, each one of which is configured so as to slide inside a corresponding groove 8 of the plate 6.

The elongated elements 16 are arranged according to a reference plane Y and feature mutual distances that are the same as the mutual distances between the corresponding grooves 8.

Figure 7:
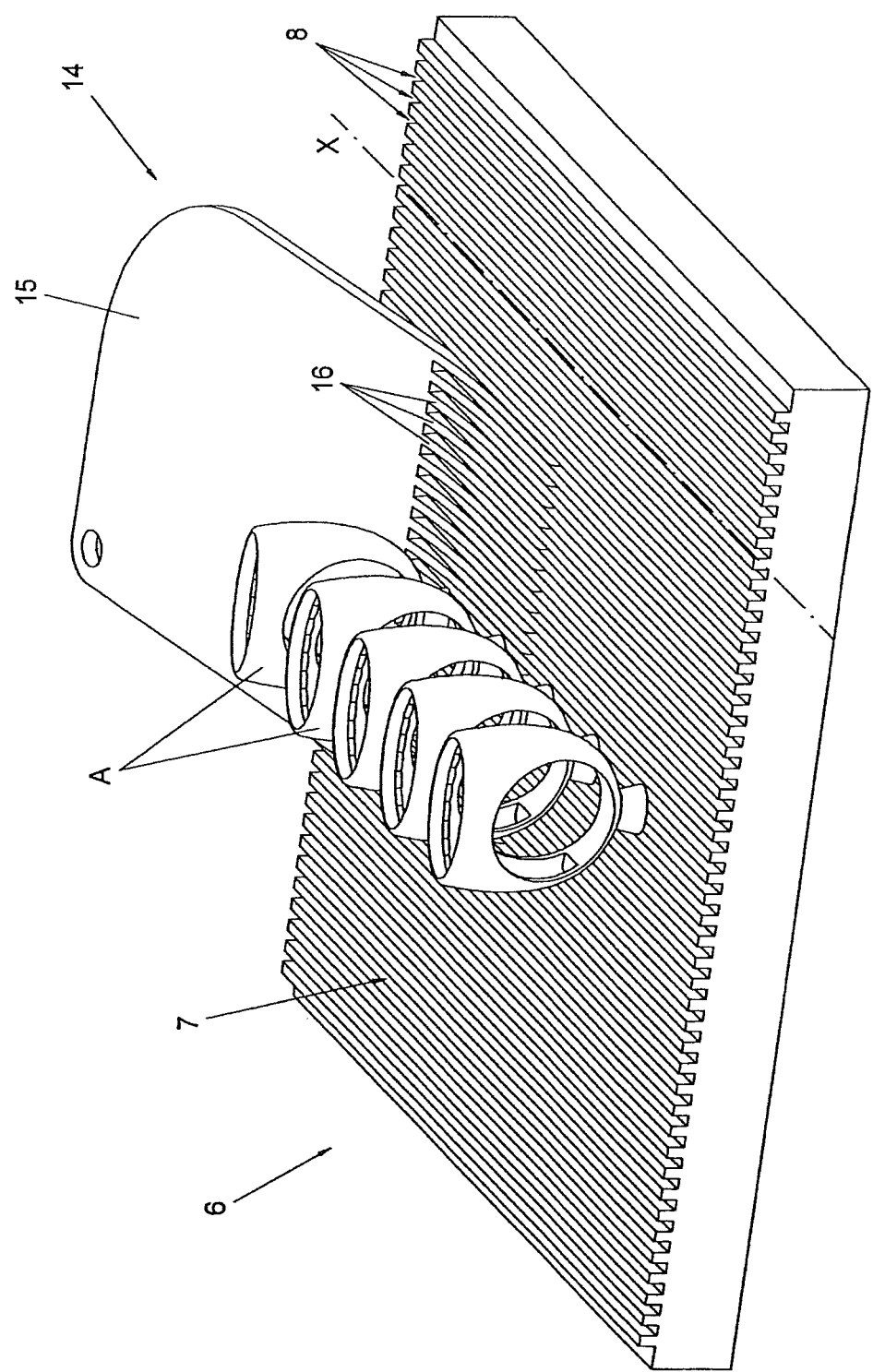
FIG. 7 illustrates the use of the tool of FIG. 5 with the plate of FIG. 3.

The sliding of the elongated elements 16 inside the corresponding grooves 8 of the plate 6 makes it possible to exert a thrusting action on the three-dimensional object A that, advantageously, causes it to be removed from the work surface 7, as shown in FIGS. 7 and 8.

Preferably but not necessarily the tool 14 is provided with a number of elongated elements 16 equal to the number of grooves 8 of the plate 6, in such a way as to allow the removal of the three-dimensional object A with one pass only.

It is evident, however, that the tool 14 can be provided with any number of elongated elements 16, even lower than the number of grooves 8.

Figure 6:
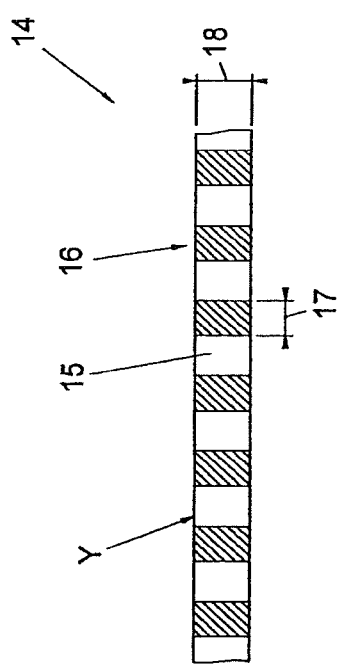
FIG. 6 shows a partial section view of the tool shown in FIG. 5.

As shown in FIG. 6, the width 17 of each elongated element 16 with respect to a direction parallel to the reference plane Y is preferably uniform and substantially equal to the width of the corresponding groove 8 of the plate 6.

In this way, advantageously, each elongated element 16 has the maximum width compatible with the corresponding groove 8, thus allowing better distribution of the thrusting action on the three-dimensional object A.

The thickness 18 of the elongated elements 16 with respect to a direction orthogonal to the reference plane Y is preferably uniform along the direction of development of the elongated elements 16.

Furthermore, the thickness 18 preferably does not exceed the depth 9 of the corresponding groove 8, so as to advantageously make it possible to comfortably insert the elongated elements 16 between the three-dimensional object A and the plate 6.

It is also preferable that the thickness 18 of the elongated elements 16 be less than the depth 9 of the grooves 8, so as to facilitate the penetration of the elongated elements 16 even when the resin 3 solidifies partially inside the grooves 8, as described above.

According to a variant embodiment of the invention, not illustrated herein, the elongated elements 16 have increasing cross section from the end towards the supporting body 15, thus serving as wedges.

The elongated elements 16 preferably have rounded ends 16a that advantageously facilitate their insertion in the corresponding grooves 8, as shown in FIG. 8.

The elongated elements 16 are preferably made of a flexible material, in particular a plastic material, with the advantage of allowing a more gradual force to be exerted on the object A during removal from the plate 6, so as to reduce the risk of damaging it.

The elongated elements 16 in plastic material offer a further advantage lying in that their hardness is lower than the hardness of the materials commonly employed for the modelling plates, normally aluminum or other materials with similar hardness.

The reduced hardness of the elongated elements 16 prevents them from removing from the surface of the plate 6 some metal particles that may contaminate the resin 3 during the successive processing cycles, and also from damaging the plate 6.

The tool 14 can obviously be entirely made of a plastic material, with the advantage of reducing costs.

For this purpose the depth 9 of the grooves 8 should preferably exceed 0.5 mm, and preferably be in the order of 1 mm, so that the thickness of the tool 14 is compatible with the use of a plastic material.

It is also evident that, in variant embodiments of the invention, the tool 14 can be made of any material.

Obviously, the plate 6 and the tool 14 of the invention can be supplied in a kit intended to be used in a stereolithography machine 1, which incorporates the advantages of both components.

In practice, after the construction of the three-dimensional object A has been completed, it can be comfortably removed from the plate 6 without damaging it, using the cleaning tool 14.

In particular, the ends 16a of the elongated elements 16 are inserted in the corresponding grooves 8 of the plate 6 and are then slided along the grooves 8, as shown in FIG. 7.

During the sliding operation, the tool 14 is kept slightly inclined, so as to thrust the three-dimensional object A towards the outside of the plate 6 until it comes off.

Advantageously, as the three-dimensional object A is thrusted at the level of its base, it remains intact during separation from the plate 6, leaving no solid residue of resin 3 stuck in the grooves 8, as shown in FIG. 8.

Therefore, advantageously, the modelling plate 6 does not require further cleaning operations before being used for the production of a new three-dimensional object.

The above clearly shows that the modelling plate, the cleaning tool, the stereolithography machine and the kit of the invention all achieve the set objects.

In particular, the grooved modelling plate makes it particularly easy to remove the finished object from the plate itself, especially if using the tool of the invention.

The use of the tool of the invention ensures an almost perfect cleaning of the modelling plate.

Furthermore, the grooves of the plate facilitate the flow of the resin during the processing cycle, limiting the stress on the bottom of the tank and thus making it possible to increase the processing speed.

In any case, further variants of the invention, even if they are neither described herein nor illustrated in the drawings, must all be considered protected by the present patent, provided that they fall within the scope of the following claims.

The invention claimed is:

1. A method for the stereolithographic production of a three-dimensional object, the method comprising: providing a tank suited to contain a liquid substance; providing a modelling plate comprising a work surface and a lateral surface, the work surface facing the bottom of the tank and suited to support the object, the modelling plate comprising at least one groove in the work surface along a development trajectory and extending to a perimeter edge of the work surface so as to have at least one open end in the lateral surface of the modelling plate; submerging the work surface of the modelling plate in the liquid substance so that a portion of the liquid substance is in the at least one groove, providing selective stimulation to the liquid substance to solidify the liquid substance in a plurality of superimposed layers each having a predefined thickness, maintaining a liquid layer of the liquid substance between the solidified object and the modeling plate in the at least one groove during the provision of selective stimulation.

2. The method according to claim 1, wherein the at least one groove includes a depth that exceeds the predefined thickness of the layers.

3. The method according to claim 1, wherein the at least one groove has both ends open at the level of the lateral surface of the modelling plate.

4. The method according to claim 1, wherein the at least one groove has a uniform cross section along the development trajectory.

5. The method according to claim 4, wherein the cross section has at least one area whose width exceeds the width of the cross section at the level of the work surface.

6. The method according to claim 4, wherein the profile of the cross section has a recess on at least one of the side edges of the cross section.

7. The method according to claim 1, wherein the at least one groove of the modelling plate further comprises a plurality of grooves parallel to each other, wherein the method further comprises maintaining liquid layers of the liquid substance in each of the plurality of grooves during the provision of selective stimulation.

8. The method according to claim 7, further comprising providing a tool for cleaning the modelling plate, the tool comprising a supporting body from which at least one elongated element develops, the tool configured to slide inside a corresponding groove of the plurality of grooves of the modeling plate.

9. The method according to claim 8, wherein at least one elongated element of the tool further comprises a supporting body from which a plurality of elongated elements develop, wherein each of the plurality of elongated elements is configured so that it can slide inside a corresponding groove of the plurality of grooves of the modelling plate, the elongated elements being mutually parallel and arranged according to a reference plane at mutual distances that are the same as the mutual distances between the corresponding grooves of the modeling plate.

10. The method according to claim 9, wherein the width of each one of the plurality of elongated elements with respect to a direction parallel to the reference plane is substantially equal to the width of the corresponding groove of the modelling plate.

11. The method according to claim 9, wherein the thickness of each one of the plurality of elongated elements in a direction orthogonal to the reference plane does not exceed the depth of the corresponding groove.

12. The machine according to claim 9, wherein the elongated elements have rounded ends.

13. The method according to claim 9, wherein the elongated elements are flexible.

14. The method according to claim 9, wherein the hardness of the elongated elements is lower than the hardness of the modelling plate.

15. The method according to claim 1, wherein the liquid layer is configured to slidingly receive an elongated element for exerting a thrusting action on the solidified object in order to detach it from the work surface.

16. The method according to claim 1, wherein the liquid layer extends to the at least one open end of the at least one groove.

17. The method according to claim 7, wherein it comprises co-acting a plurality of elongated elements of a tool configured to slide inside the plurality of grooves of the modeling plate which is matching to the co-acting plurality of elongated elements of the tool in order to allow easy removal of the solidified object without breaking the object.

* * * * *